Sept. 23, 1969     S. L. SEATON     3,469,087
LASER CALIBRATOR

Filed Dec. 8, 1965     2 Sheets-Sheet 1

INVENTOR
STUART L. SEATON
BY
ATTORNEYS

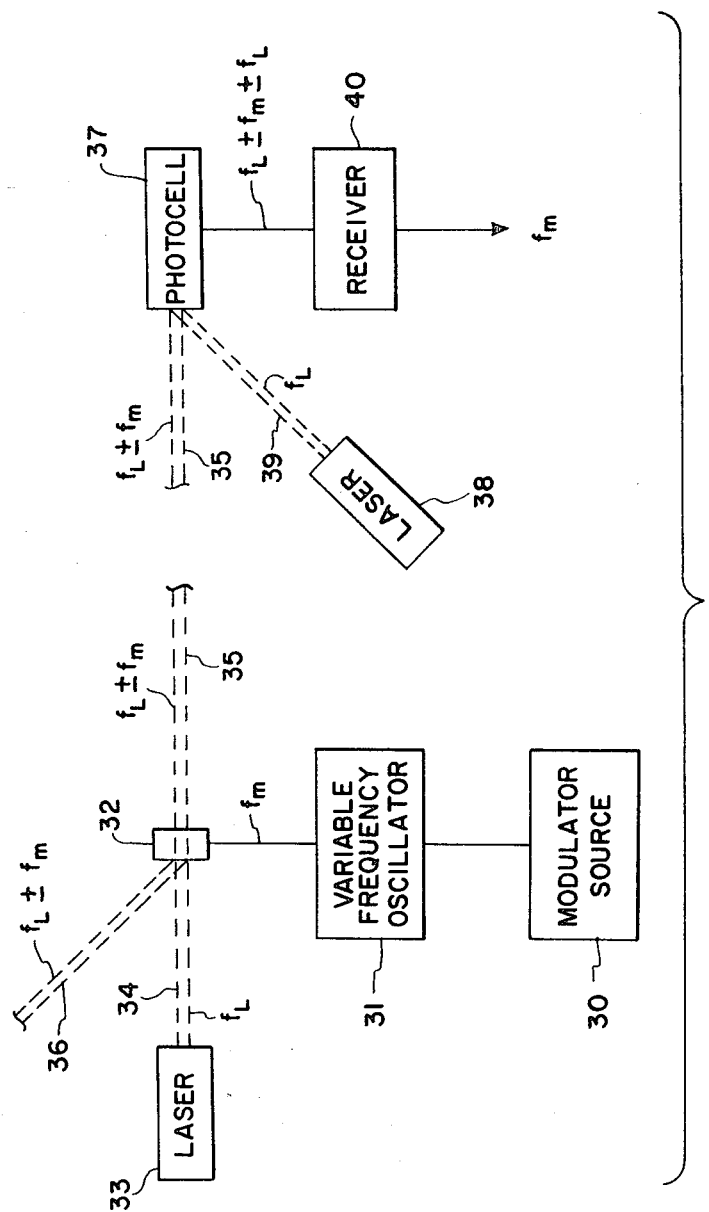

United States Patent Office 3,469,087
Patented Sept. 23, 1969

3,469,087
LASER CALIBRATOR
Stuart L. Seaton, Hampton, Va., assignor to the United States of America as represented by the Administrator of the National Aeronautics and Space Administration
Filed Dec. 8, 1965, Ser. No. 512,561
Int. Cl. H04b 9/00; G01r 29/22
U.S. Cl. 250—199    4 Claims

ABSTRACT OF THE DISCLOSURE

A device for measuring the power output of a laser. The laser beam is directed into a piezoelectric crystal and the resulting output from the crystal measured. In one embodiment the voltage output is measured and in another embodiment the change in the natural frequency of the crystal is measured.

---

The invention described herein may be manufactured and used by or for the Government of the United States of America for governmental purposes without the payment of any royalties thereon or therefor.

The invention relates generally to a measuring device and more specifically concerns a device for measuring the output of a laser. A secondary purpose of the invention is to provide a means for modulating and demodulating a laser beam and/or pulse.

The prior art in the area of measuring the output of lasers usually involves classical devices such as bolometers, photoelectric sensors, and in one instance, a ballistic pendulum. None of these means has proven entirely satisfactory because of the low power of the gas laser on the one and, and because of the very short duration of the pulse in the high-power ruby laser on the other hand.

It is therefore an object of this invention to provide unique means for measuring the output of a laser.

Another object of this invention is to provide means for modulating a laser beam.

A further object of this invention is to provide means for demodulating a modulated laser beam.

Still another object of this invention is to provide means for transmitting information along a laser beam.

Other objects and advantages of this invention will further become apparent hereinafter and in the drawings, in which:

FIG. 3 is a schematic drawing of an embodiment of the invention for transmitting information along a laser beam.

Figure 1:
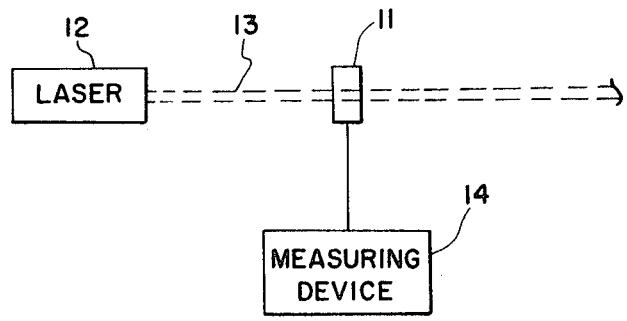
FIG. 1 is a schematic drawing of an embodiment of the invention for measuring the power of a laser beam.

In describing the preferred embodiments of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the specific embodiments of the invention selected for illustration in the drawings, the number 11 in FIG. 1 designates a piezoelectric crystal which can be made from any kind of piezoelectric material. A pulse type laser 12 produces a laser beam 13 which is directed into the mechanical axis of piezoelectric crystal 11. As is well known, laser beam 13 is made up of electromagnetic particles which, when they strike piezoelectric crystal 11, apply a pressure to the mechanical axis of crystal 11. It is also well known that when a pressure is applied to the mechanical axis of a piezoelectric crystal, the crystal produces an electrical output across its electrical axis. Consequently, when a pulse from laser 12 impinges upon piezoelectric crystal 11 a mechanical force is applied to the mechanical axis of the crystal. This results in an electrical pulse being produced across the electrical axis of the crystal. The amplitude of this electrical pulse is proportional to the mechanical force applied to the crystal which in turn is proportional to the power of the pulse emitted by laser 12. The amplitude of the electrical pulse produced by crystal 11 is measured by a suitable measuring device 14 such as an oscilloscope. If measuring device 14 is calibrated, the power of each pulse emitted by laser 12 can be measured.

Figure 2:
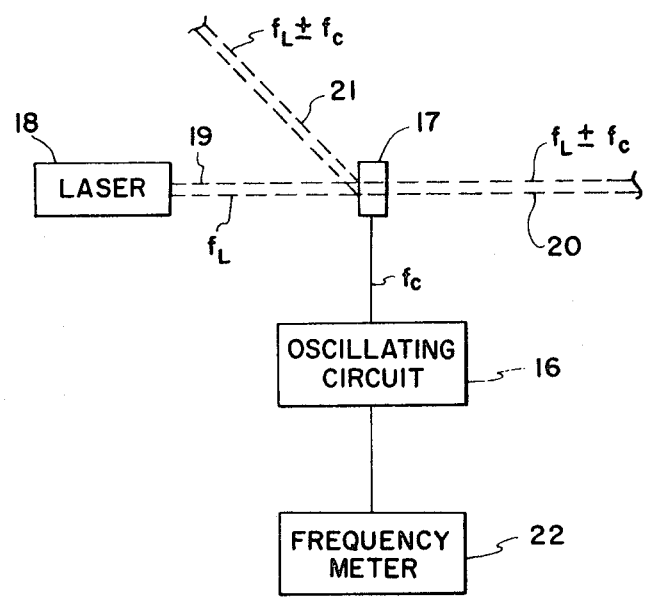
FIG. 2 is a schematic drawing of an embodiment of the invention for measuring the power of a laser beam and for modulating the laser beam.

Referring now to FIG. 2, there is shown a device that will measure the power of a laser beam and at the same time modulate the laser beam. This device consists essentially of an oscillating circuit 16 containing a piezoelectric crystal 17. Crystal 17 can be a quartz crystal or a tourmaline crystal, or a similar structure. As is well known in the electronics art, oscillating circuit 16 will oscillate at the natural frequency of crystal 17. A laser 18 emits a beam 19 that is directed in to the mechanical axis of crystal 17. Part of beam 19 will be transmitted through crystal 17 and part will be reflected. The part that is transmitted is a beam 20 and the part that is reflected is a beam 21. Beam 19 applies a pressure to the mechanical axis of crystal 17 which changes the natural frequency of the crystal, thereby changing the frequency of oscillating circuit 16. This change in frequency is measured by a frequency meter 22, and is proportional to the power output of laser 18. Frequency meter 22 can be a panoramic analyzer or it can be any well known type of frequency meter. It should be noted that the device in FIG. 2 will measure the power output of either a continuous output laser or the power of a pulse-type laser.

The device in FIG. 2, in addition to measuring the power output of a laser, will also modulate the laser output. Since crystal 17 will be oscillating at the same frequency as oscillating circuit 16 which we will say is $f_c$, beam 20 will contain frequencies $f_L \pm f_c$ where $f_L$ is the frequency of the laser output. This is by virtue of the change in refraction of crystal 17 caused by is oscillations. Also reflected beam 21 will contain frequencies equal to $f_L \pm f_c$ by virtue of the Doppler effect.

The device in FIG. 3 provides means for transmitting information on a laser beam. A modulator source 30 produces a varying output voltage which is applied to a voltage controlled variable frequency oscillator 31. Modulator source 30 can be any device well known in the communication art which will produce a voltage output whose amplitude is proportional to the information being transmitted. Consequently, the frequency output $f_m$ from oscillator 31 will be proportional to the information being transmitted. This frequency is applied to the electrical axis of a piezoelectric crystal 32 which causes the crystal to oscillate at a frequency $f_m$. A laser 33 produces a beam 34 that has a frequency $f_L$. Beam 34 is directed into crystal 32 which divides the beam into a transmitted beam 35 and a reflected beam 36. As was described above, the transmitted beam 35 has frequencies equal to $f_L \pm f_m$ by virtue of the changes in refraction of crystal 32 and the reflected beam 36 has frequencies equal to $f_L \pm f_m$ by virtue of the Doppler effect. It is evident that either the transmitter beam 35 or the reflected beam 36 can be used to transmit information. However, in FIG. 3 only the beam 35 is utilized to transmit the information. Beam 35 is transmitted to a remote receiving station where it is picked up by a photocell 37. Located at the receiving station is a laser 38 which produces a beam 39 having a frequency $f_L$. The frequency of laser 38 can differ slightly from the frequency of laser 33; however, it is best if the two frequencies are equal. Beam 39 is picked up by photocell 37 and mixed with beam 35. The output of photocell 37 is an electrical signal having frequencies $f_L \pm f_m \pm f_L$. This signal is applied to a receiver 40 which removes the $f_L$ frequencies and produces an $f_m$ frequency output. During the operation of the device in FIG. 3, it is desirable that all frequencies remain steady and not wander around.

The advantages of this invention lie in the novel and simple means for measuring laser power and for modulating a laser frequency.

It is to be understood that the form of the invention herewith shown and described is to be taken as a preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the following claims.

What is claimed is:

1. A device for measuring the power output of a laser comprising: a piezoelectric crystal located in the path of the beam produced by said laser such that the pressure of said laser beam is applied to the mechanical axis of said piezoelectric crystal; and electrical circuit means connected to the electrical axis of said piezoelectric crystal for measuring the output of said crystal due to the pressure exerted by said laser beam against said piezoelectric crystal whereby the measure of the output of said crystal is proportional to the power output of said laser.

2. A device for measuring the power output of a laser in accordance with claim 1 wherein said electrical circuit means comprises a device for measuring the voltage produced across the electrical axis of said piezoelectric crystal by the pressure from said laser beam.

3. A device for measuring the power output of a laser in accordance with claim 1 wherein said electrical circuit means comprises a device for measuring the change in the natural frequency of said piezoelectric crystal due to the pressure of said laser beam.

4. A device for measuring the power output of a laser in accordance with claim 1 wherein said electrical circuit means comprises an oscillating circuit including said piezoelectric crystal and a frequency meter for measuring changes of frequencies of said oscillating circuit whereby the changes of frequencies of said oscillating circuit are proportional to the power output of said laser.

References Cited

UNITED STATES PATENTS

| | | | |
|---|---|---|---|
| 1,783,297 | 12/1930 | Meissner | 324—97 |
| 2,802,984 | 8/1957 | Sussman | 324—56 |
| 2,877,338 | 3/1959 | Berge | 324—56 |
| 3,237,011 | 2/1966 | Sterzer | 250—199 |
| 3,297,876 | 1/1967 | De Maria | 250—199 |
| 3,327,121 | 6/1967 | Thomas | 250—199 |
| 3,339,073 | 8/1967 | Hunter | 250—199 |

OTHER REFERENCES

Carpenter: Journal of the Optical Society of America, Electro-Optic Effect in Uniaxial Crystals, April 1950, vol. 40, No. 4, pp. 225, 250–199.

LeLon Dulberger: Electronics, Lasers, Devices and Systems, Part IV, Nov. 24, 1961, pp. 54–57.

RALPH D. BLAKESLEE, Primary Examiner

ALBERT J. MAYER, Assistant Examiner

U.S. Cl. X.R.

324—56, 96, 118; 331—94.5; 332—7.51; 350—160; 356—213